US009821682B2

(12) United States Patent
Jeong et al.

(10) Patent No.: US 9,821,682 B2
(45) Date of Patent: Nov. 21, 2017

(54) SEAT CUSHION EXTENSION APPARATUS

(71) Applicants: Hyundai Motor Company, Seoul (KR); Kia Motors Corporation, Seoul (KR)

(72) Inventors: Chan Ho Jeong, Gunpo-si (KR); Seon Chae Na, Yongin-si (KR); Jung Sang You, Anyang-si (KR); Sang Uk Yu, Seoul (KR); Jong Moon Yoo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/930,152

(22) Filed: Nov. 2, 2015

(65) Prior Publication Data

US 2016/0144744 A1    May 26, 2016

(30) Foreign Application Priority Data

Nov. 25, 2014 (KR) .................... 10-2014-0164914

(51) Int. Cl.
*B60N 2/02* (2006.01)

(52) U.S. Cl.
CPC ......... *B60N 2/0284* (2013.01); *B60N 2/0232* (2013.01)

(58) Field of Classification Search
CPC ...... B60N 2/0284; B60N 2/0224; B60N 2/72; B60N 2/0232
USPC .................................................. 297/284.11
See application file for complete search history.

(56) References Cited

U.S. PATENT DOCUMENTS

| 6,095,610 | A | * | 8/2000 | Okajima | ............ | B60N 2/4495 |
| | | | | | | 297/423.2 |
| 7,614,693 | B2 | * | 11/2009 | Ito | ................... | B60N 2/0284 |
| | | | | | | 297/284.11 |
| 7,669,928 | B2 | * | 3/2010 | Snyder | ............. | B60N 2/0232 |
| | | | | | | 297/283.2 |
| 8,167,370 | B2 | * | 5/2012 | Arakawa | ............ | B60N 2/0232 |
| | | | | | | 297/284.11 |
| 2001/0048239 | A1 | * | 12/2001 | Kogure | .............. | B60N 2/62 |
| | | | | | | 297/423.2 |

(Continued)

FOREIGN PATENT DOCUMENTS

| KR | 2011-0016566 A | 2/2011 |
| KR | 10-2011-0031781 A | 3/2011 |
| KR | 2011-0031782 A | 3/2011 |

(Continued)

*Primary Examiner* — Milton Nelson, Jr.
(74) *Attorney, Agent, or Firm* — McDermott Will & Emery LLP

(57) ABSTRACT

A seat cushion extension apparatus comprises a slide rail disposed on a lower side of a cushion frame; an extension panel coupled to a front end of the slide rail and disposed on a front side of the cushion frame; an extension motor having a lead screw, disposed on the lower side of the cushion frame; a first hinge bracket coupled to the end of the slide rail and disposed at a rear upper side of the extension panel; and a second hinge bracket coupled to the end of the lead screw and disposed at a rear lower side of the extension panel, wherein the extension panel is configured to slide forward along the slide rail and to extend forward while rotating in a front upper direction through actuation of the lead screw driven by the extension motor.

6 Claims, 11 Drawing Sheets

(56) References Cited

U.S. PATENT DOCUMENTS

2007/0108817 A1* 5/2007 Lee .................... B60N 2/62
  297/284.11
2011/0254335 A1* 10/2011 Pradier ............... B60N 2/0232
  297/284.11

FOREIGN PATENT DOCUMENTS

| KR | 10-2011-0054531 A | 5/2011 |
| KR | 20-2012-0004955 U | 7/2012 |
| KR | 10-2013-0139584 A | 12/2013 |

* cited by examiner

[ BEFORE ACTUATION ]

[ AFTER ACTUATION ]

[A-A CROSS-SECTIONAL VIEW]

SEAT CUSHION EXTENSION APPARATUS

CROSS-REFERENCE TO RELATED APPLICATION

This application claims the benefit under 35 U.S.C. §119(a) of priority to Korean Patent Application No. 10-2014-0164914, filed on Nov. 25, 2014, the entire content of which is incorporated herein by reference.

TECHNICAL FIELD

The present disclosure relates to a seat cushion extension apparatus, and more particularly, to a seat cushion extension apparatus that can induce a stable posture of a passenger and can also maintain the an aesthetic of an exterior by preventing a loosing phenomenon of a covering, thereby preventing wrinkles from being generated at a corner while extending the seat cushion.

BACKGROUND

In general, a front seat and a rear seat on which a driver and a passenger can sit are installed on a floor of a vehicle.

The front seat adopts a separation type in which a driver seat and a passenger seat are separately configured, while the rear seat adopts a bench type in which left and right seats are integrally coupled.

In an overall configuration of the front seat for the vehicle in the related art, the front seat is constituted by a seat cushion fixed onto a horizontal frame that moves forward and backward along a guiderail installed on the floor and a seat back fixed to a vertical frame disposed at a predetermined angle to the horizontal frame.

Further, a headrest in which a passenger reclines a head and that also protects the head is mounted on the top of the seat back.

Moreover, a length control lever that controls the position of the entire seat is installed on the bottom of the seat cushion according to a body type of the passenger and an angle control lever that can control an inclination angle of the seat back which is installed on the side of the seat.

In addition, when the vehicle turns quickly, a side guard for waist protection is formed on both sides of the seat back, which is used to prevent an occupant's posture from being loosened by centrifugal force while supporting a waist part of the passenger.

However, in the seat cushion of the seat for the vehicle in the related art, front and rear lengths are set to predetermined lengths not to correspond to various lower body lengths of the passenger, and as a result, when a passenger having a large lower body length sits on the seat cushion, a space which is not supported is generated between a knee and a thigh, and as a result, a convenient posture cannot be guaranteed when the passenger sits on the seat for a long time.

In the related art, in order to compensate for the aforementioned problem, as illustrated in FIG. 1, a passenger having a large body type can conveniently position a leg by using a main rod member 32 which protrudes toward the front of the cushion frame. An occupant may configure a linear movable mechanism 30 and a rotational mechanism 40 that are coordinated so as to improve ride comfort. The main rod member 32 includes the linear movable mechanism 30 that moves straight and protrudes to the front of the cushion frame 1 and a rotational rod member 45 constituting the rotational mechanism 40 is covered with a cushion cover forming an exterior.

In more detail, a separate apparatus needs to be mounted on the bottom in order to maintain forward movement and linear movement in the forward movement by a motor lead screw while being inserted into a hollow pipe having a pipe shape, which is mounted on a cushion panel through organic coupling of the linear movable mechanism 30, the main rod member 32, and the support rod member 33, and a front rotation link 44 is connected to a rod bracket 34 and a rotational rod member 45, a rear rotation link 42 is connected to a rotational axis member 41, and the front rotation link 44 and the rear rotation link 42 have guide holes, respectively and are connected by a pin and the guide holes serve as a guide so that the linear movable mechanism 30 linearly moves, and as a result, the rotation of the rotational rod member 45 and the rear rotation link 42 and the front rotation link 44 move along the guide maintain the linear movement.

However, in the related art, when the seat cushion is extended, a loosing phenomenon occurs in a pad and the covering, and as a result, the posture of the passenger becomes inconvenient as illustrated in FIG. 2A and curves and wrinkles occur with bending of a corner portion of the seat, and as a result, the exterior appearance is diminished as illustrated in FIG. 2B.

Further, when the linear movable mechanism 30 extends the seat cushion, the linear movable mechanism may usefully support a femoral region of the passenger, but interference may occur at a calf portion, and as a result, a leg cannot be bent.

The above information disclosed in this Background section is only for enhancement of understanding of the background of the inventive concept and therefore it may include information that does not form the prior art that is already known in this country to a person of ordinary skill in the art.

SUMMARY

The present disclosure has been made in an effort to solve the above-described problems associated with prior art.

The present disclosure provides a seat cushion extension apparatus which can provide a stable posture of a passenger and maintain an aesthetic of an exterior by preventing a loosing phenomenon of a covering, preventing wrinkles from being generated at a corner while extending a seat cushion by configuring an extension panel to smoothly rotate at a constant speed through an inter-guide operation of a side bracket of the extension panel and a guide bracket of a cushion frame.

In one aspect, the present disclosure provides a seat cushion extension apparatus comprising a slide rail disposed on a lower side of a cushion frame; an extension panel coupled to a front end of the slide rail and disposed on a front side of the cushion frame; an extension motor having a lead screw, disposed on the lower side of the cushion frame; a first hinge bracket coupled to the end of the slide rail and disposed at a rear upper side of the extension panel; and a second hinge bracket coupled to the end of the lead screw and disposed at a rear lower side of the extension panel, wherein the extension panel is configured to slide forward along the slide rail and to extend forward while rotating in a front upper direction through actuation of the lead screw driven by the extension motor.

The guide brackets may be disposed on both sides of the cushion frame, and side brackets may be disposed on both ends of the extension panel.

The side brackets may include a guide hole having a curved shape in the longitudinal direction of the side bracket, and a guide roll coupled to the guide hole.

An injection-molded guide member may be disposed in the guide hole of the guide bracket and an injection-molded friction member may be disposed on the guide roll of the side bracket to correspond to the guide member.

Two rail grooves disposed on an upper panel of the cushion frame, and a hinge pipe may be coupled to the slide rail and disposed in a horizontal direction.

The lead screw may be coupled to a control bush disposed on the upper panel of the cushion frame, and the lead screw may be coupled to the second hinge bracket through a connection tab.

Since a femoral region is supported without interfering with a calf part of a passenger by preventing a covering loosing phenomenon of a seat cushion during extension, a stable posture may be provided and since wrinkle are not generated at a corner portion of a covering in spite of repeated bending work, an exterior appearance can be maintained.

Further, due to fewer components than in the related art, a weight and a material are structurally saved, and as a result, total cost can be saved.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept, and wherein:

FIGS. 5A and 5B to 7A and 7B are configuration diagrams of an operating state of the seat cushion extension apparatus according to the present inventive concept;

Figure 1:
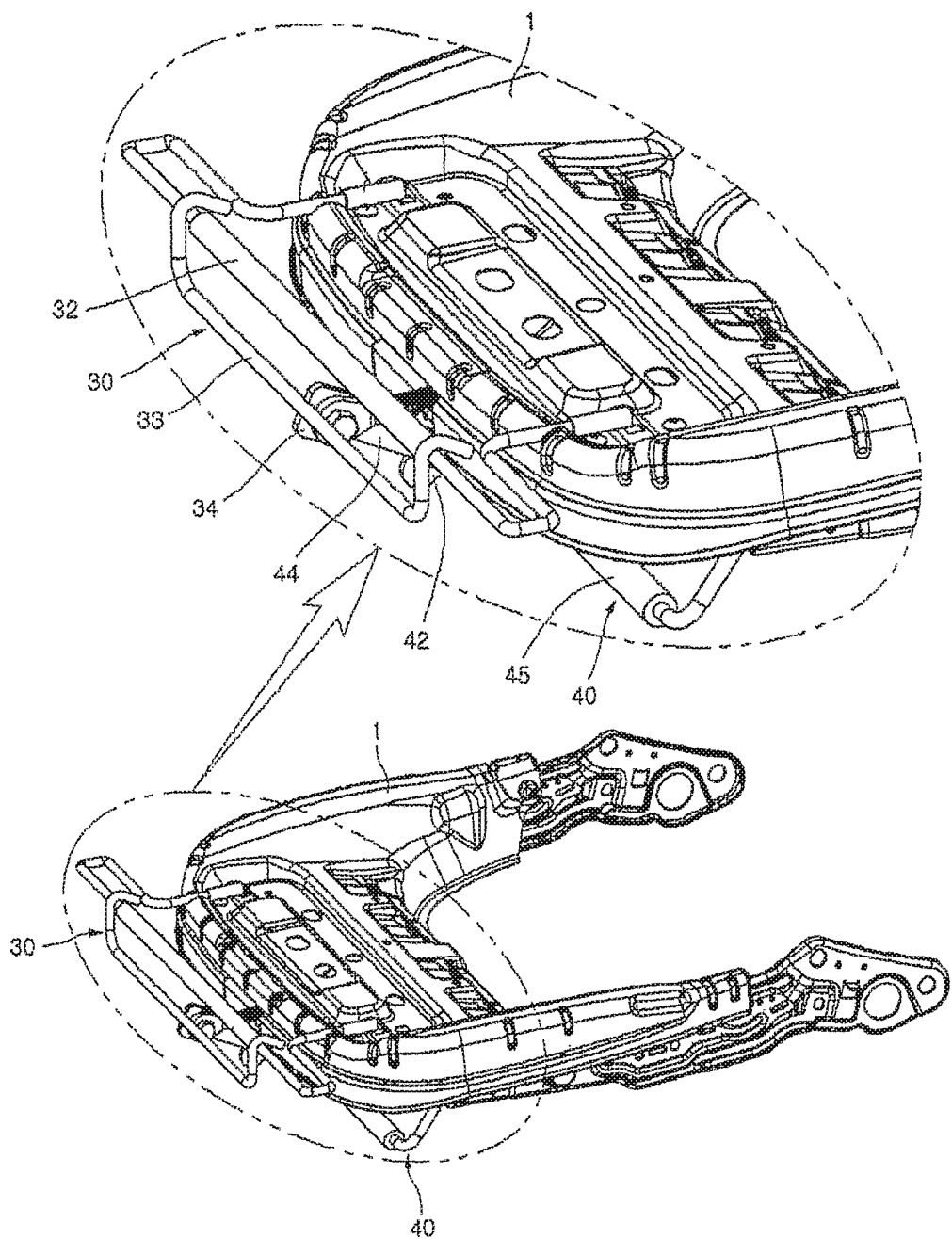
FIG. 1 is a configuration diagram of a seat cushion extension apparatus in the related art.
Figure 2A:
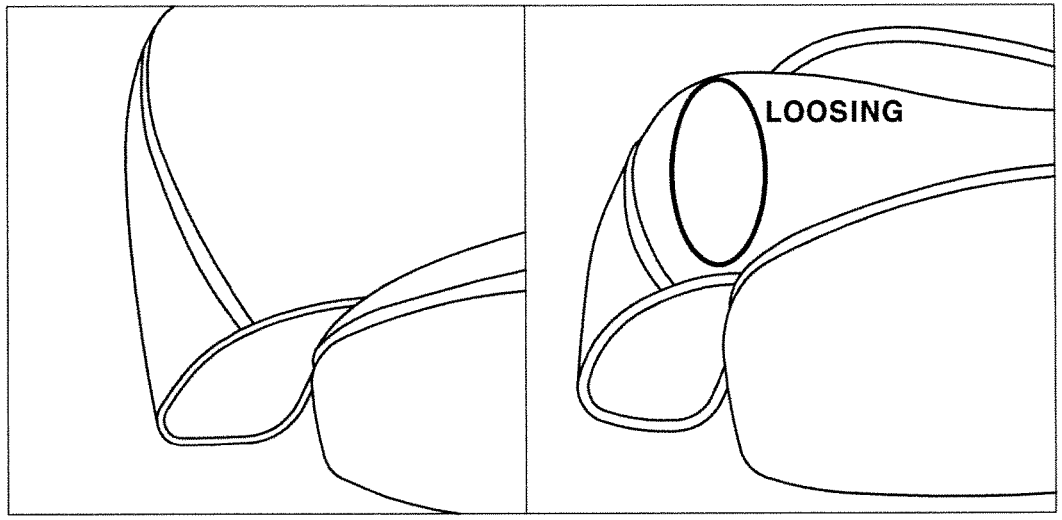
FIGS. 2A and 2B are exemplary diagrams of an operating state of the seat cushion extension apparatus in the related art.
Figure 2B:
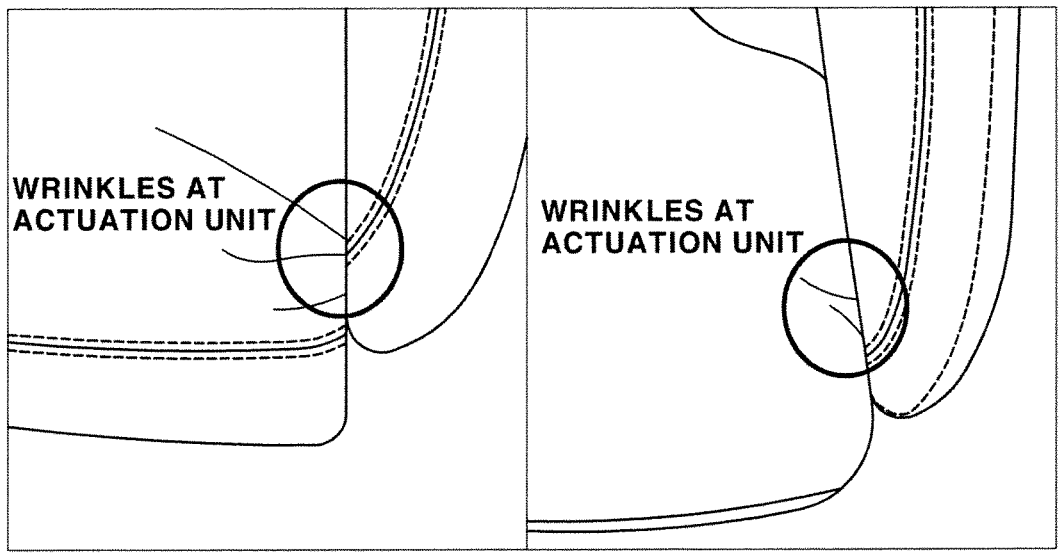

It should be understood that the appended drawings are not necessarily to scale, presenting a somewhat simplified representation of various features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

Hereinafter, an embodiment of the present inventive concept will be described with reference to the accompanying drawings.

Figure 3:
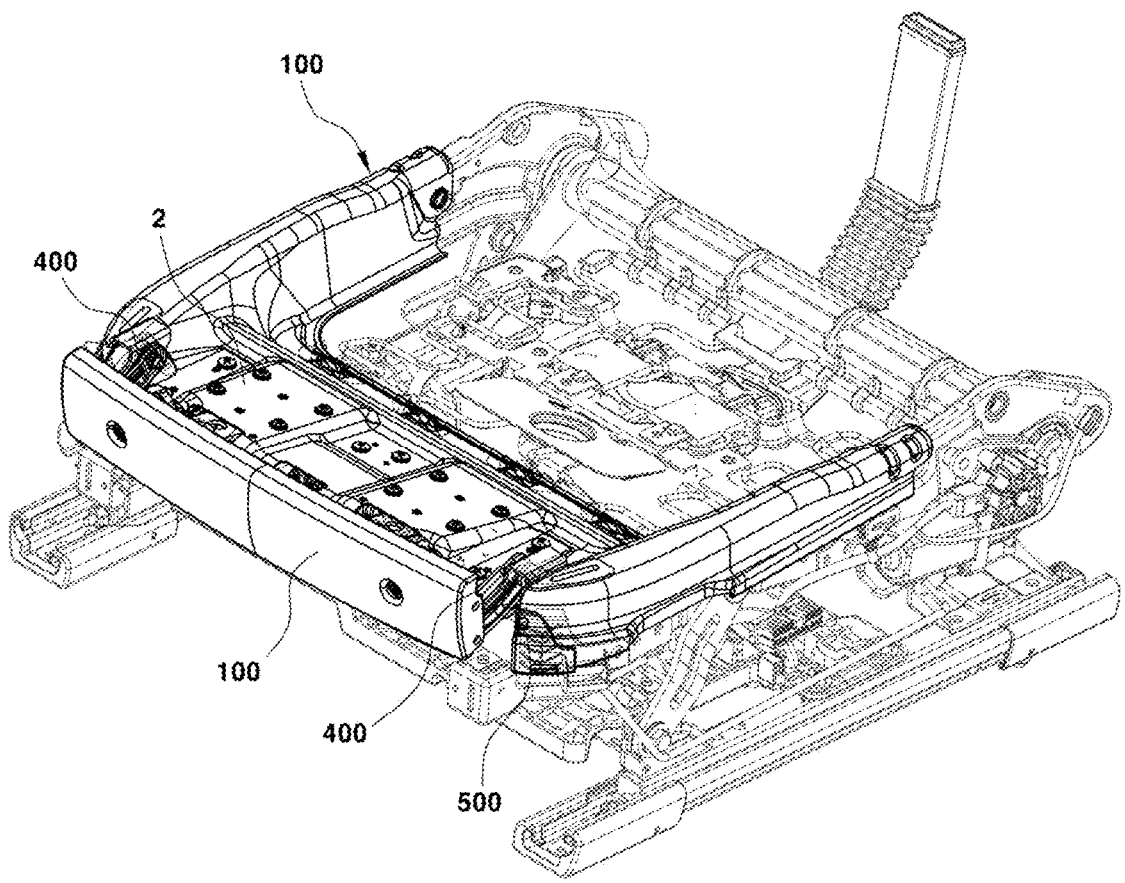
FIG. 3 is a configuration diagram of a seat cushion extension apparatus according to the present inventive concept.
Figure 4:
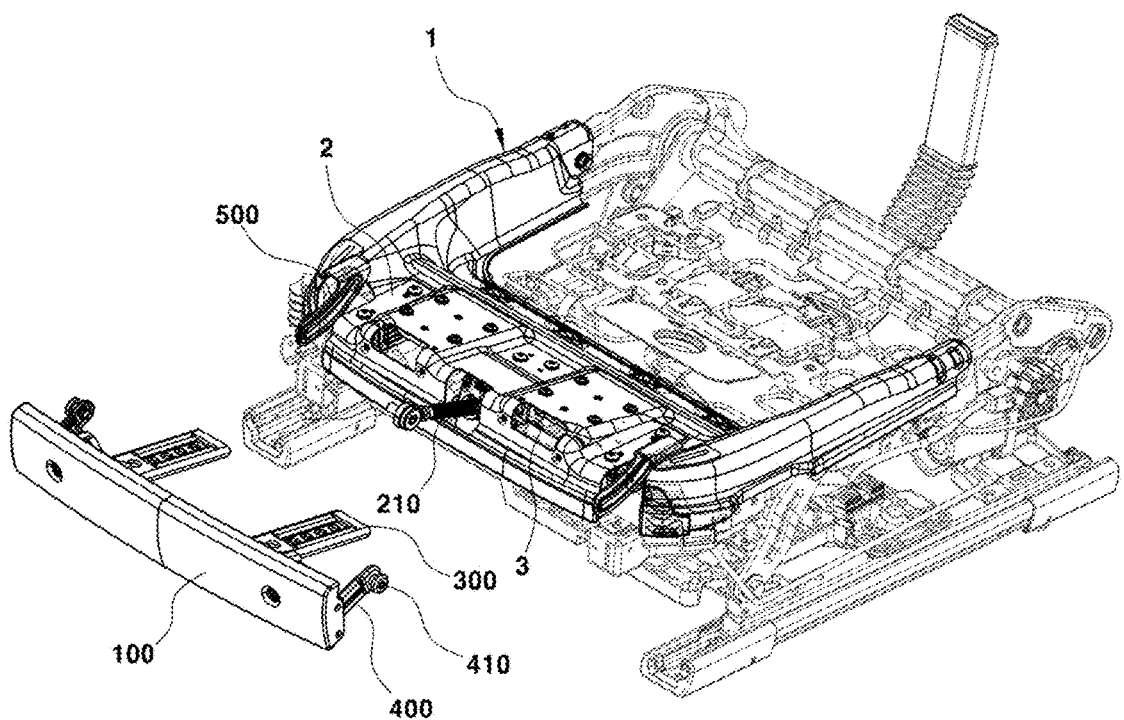
FIG. 4 is a configuration diagram illustrating a separation state of the seat cushion extension apparatus according to the present inventive concept.

In a seat cushion extension apparatus according to the present inventive concept, as illustrated in FIGS. 3 and 4, a slide rail 300 is provided at a lower side of a cushion frame 1 forming a framework of a seat cushion to be withdrawn forward and an extension panel 100 connected to a front end of the slide rail 300 is provided at a front side of the cushion frame 1.

In addition, the seat cushion extension apparatus is configured to include an extension motor 200 having a lead screw 210, which is formed at the lower side of the cushion frame 1 so that the extension panel 100 slides forward along the slide rail 300.

Herein, the extension panel 100 extends forward while rotating in a front upper direction through forward and backward actuation of the lead screw 210 through the operation of the extension motor 200.

To this end, a first hinge bracket 110 hinge-coupled to the end of the slide rail 300 is formed at a rear upper side of the extension panel 100 and a second hinge bracket 120 hinge-coupled to correspond to the end of the lead screw 210 may be fixed and installed at a rear lower side of the extension panel 100.

Figure 9:
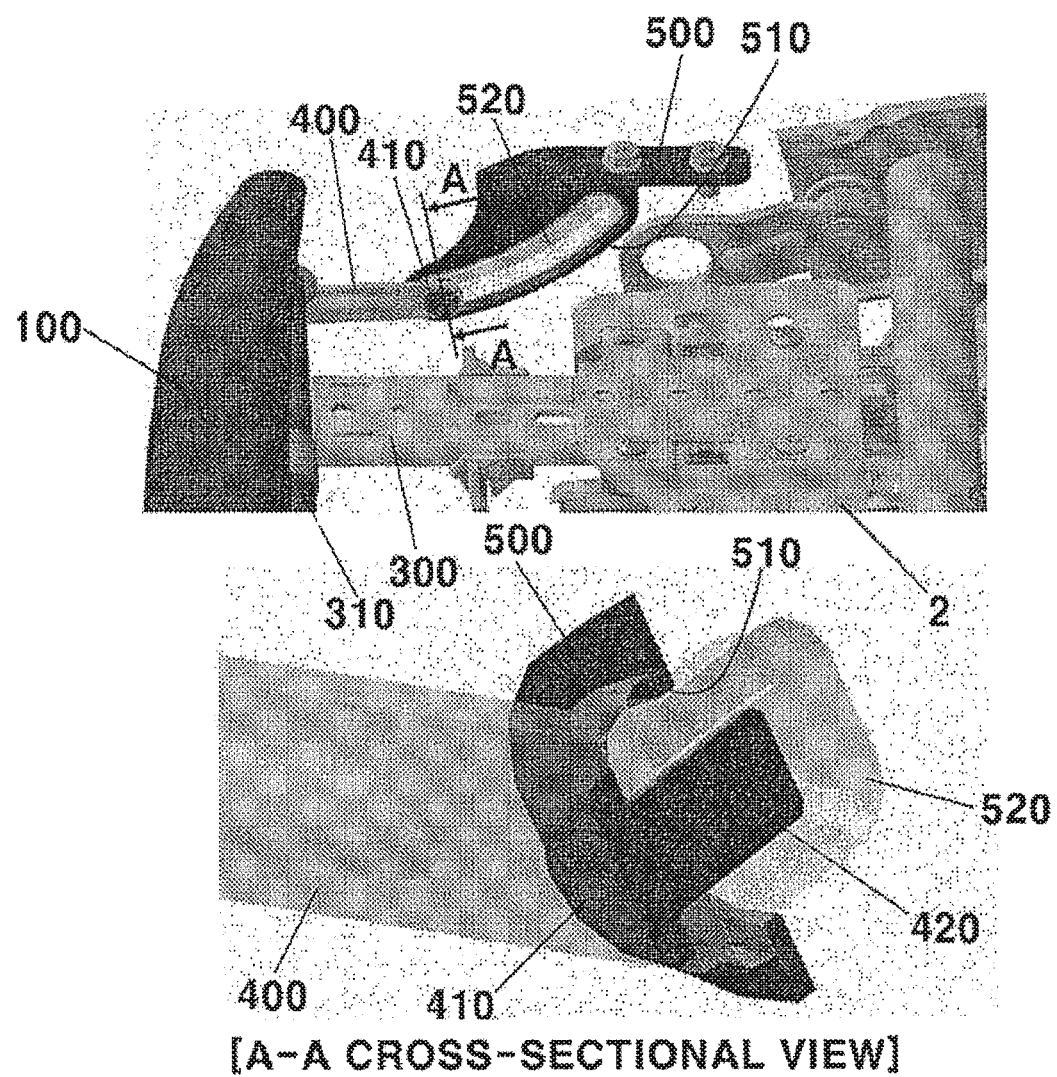
FIG. 9 is an enlarged cross-sectional configuration diagram of a primary part of a side bracket in the seat cushion extension apparatus according to the present inventive concept.

Meanwhile, according to FIG. 9, guide brackets 500 are provided at both sides of the cushion frame 1, respectively, and a side bracket 400 is further provided at both ends of the extension panel 100, which guides the extension panel 100 to be easily rotated by the first hinge bracket 110 while extending to correspond the guide bracket 500.

Further, a guide hole 510 that guides the side bracket 400 is formed to penetrate in the longitudinal direction in the guide bracket 500 so as to rotate the extension panel 100 at a constant speed while extending.

In addition, a guide roll 410 penetration-coupled to the guide hole 510 is formed to protrude at the end of the side bracket 400.

In addition, an injection-molded guide member 520 is detachably provided at the guide hole 510 of the guide bracket 500 and an injection-molded friction member 420 is provided in the guide roll 410 of the side bracket 400 to correspond to the guide member 520.

Therefore, friction between the guide member 520 and the friction member 420 may prevent a product from being damaged due to repeated rotation of the extension panel 100 and may allow the extension panel 100 to be rotated more smoothly.

Figure 8:
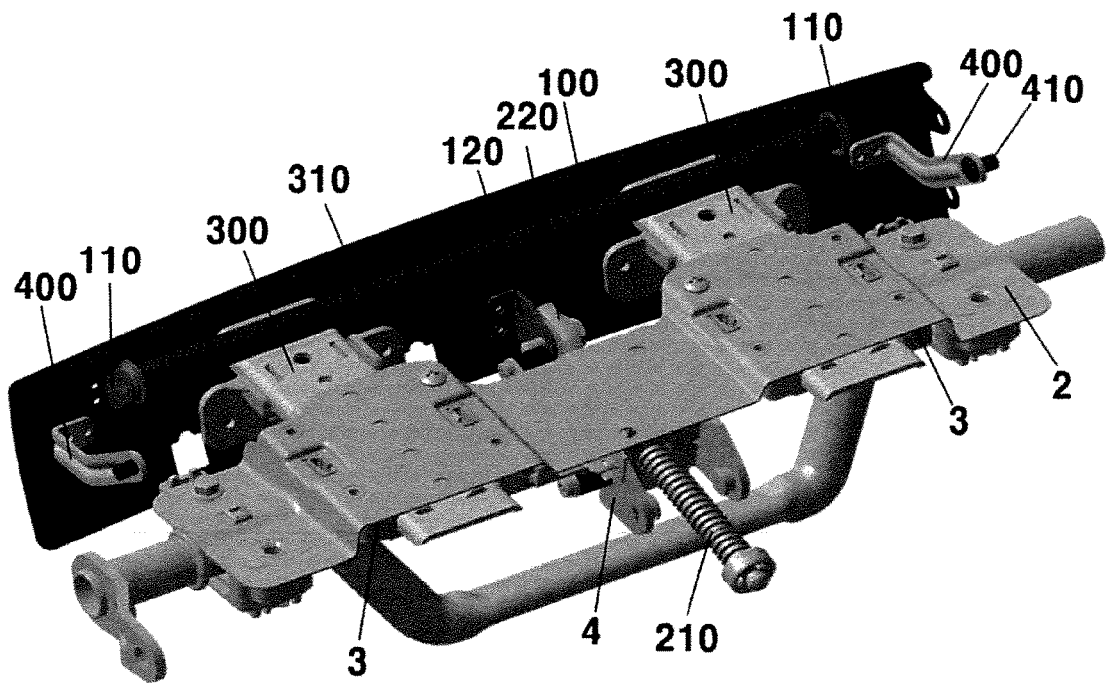
FIG. 8 is an enlarged configuration diagram of a primary part of the seat cushion extension apparatus according to the present inventive concept.

Meanwhile, according to FIG. 8, two rail grooves 3 that guide the slide rail 300 are formed on an upper panel 2 of the cushion frame 1 and the slide rail 300 is provided at each rail groove 3 to be slidable.

In this case, a hinge pipe 310 that links the respective slide rails 300 is installed at the end of the slide rail 300 in a horizontal direction so that two slide rails 300 simultaneously slide.

In addition, two first hinge brackets 110 formed on the extension panel 100 to correspond to both ends of the hinge pipe 310 may be hinge-coupled by a fastening bolt.

Meanwhile, the lead screw 210 is fastened to a control bush 4 formed at a lower center of the upper panel 2 to operate forward and backward along the control bush 4 while rotating by driving the extension motor 200.

In addition, a connection tab 220, that may be hinge-coupled to the second hinge bracket 120 formed at a rear lower center of the extension panel 100 by a fastening bolt, is provided at the end of the lead screw 210 so as to extend the extension panel 100 regardless of the rotation of the lead screw 210.

Figure 5A:
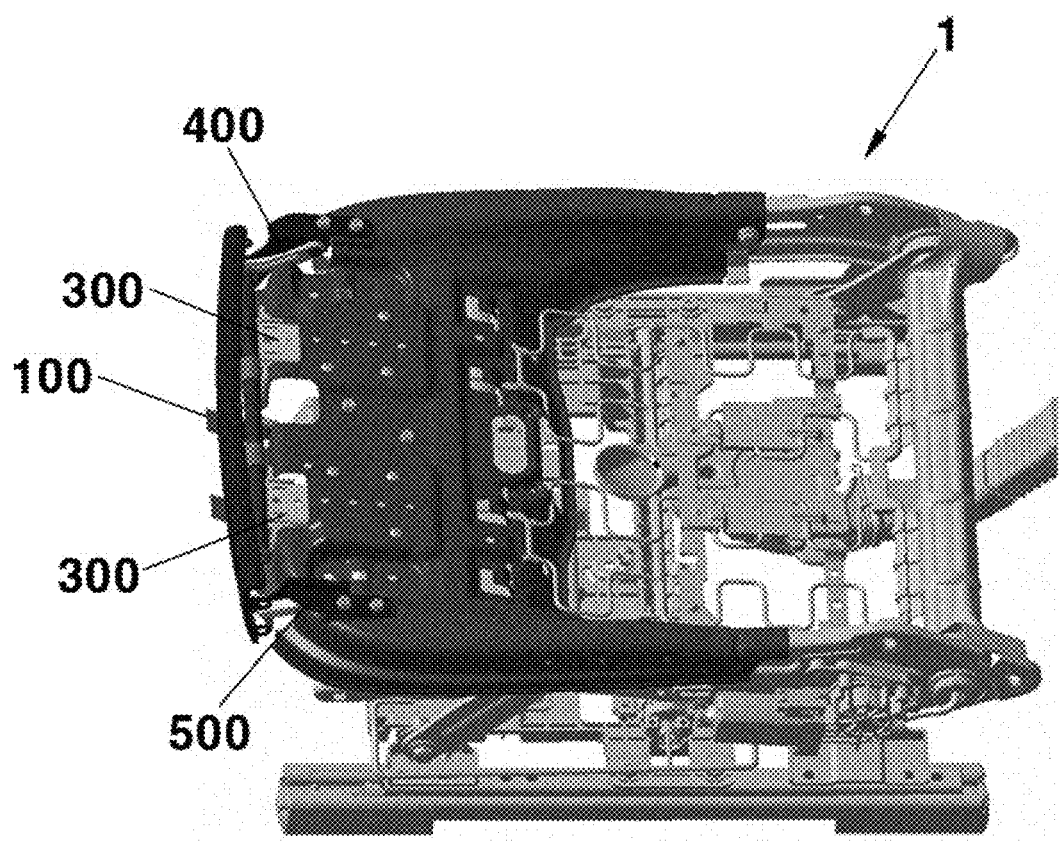
Figure 5B:
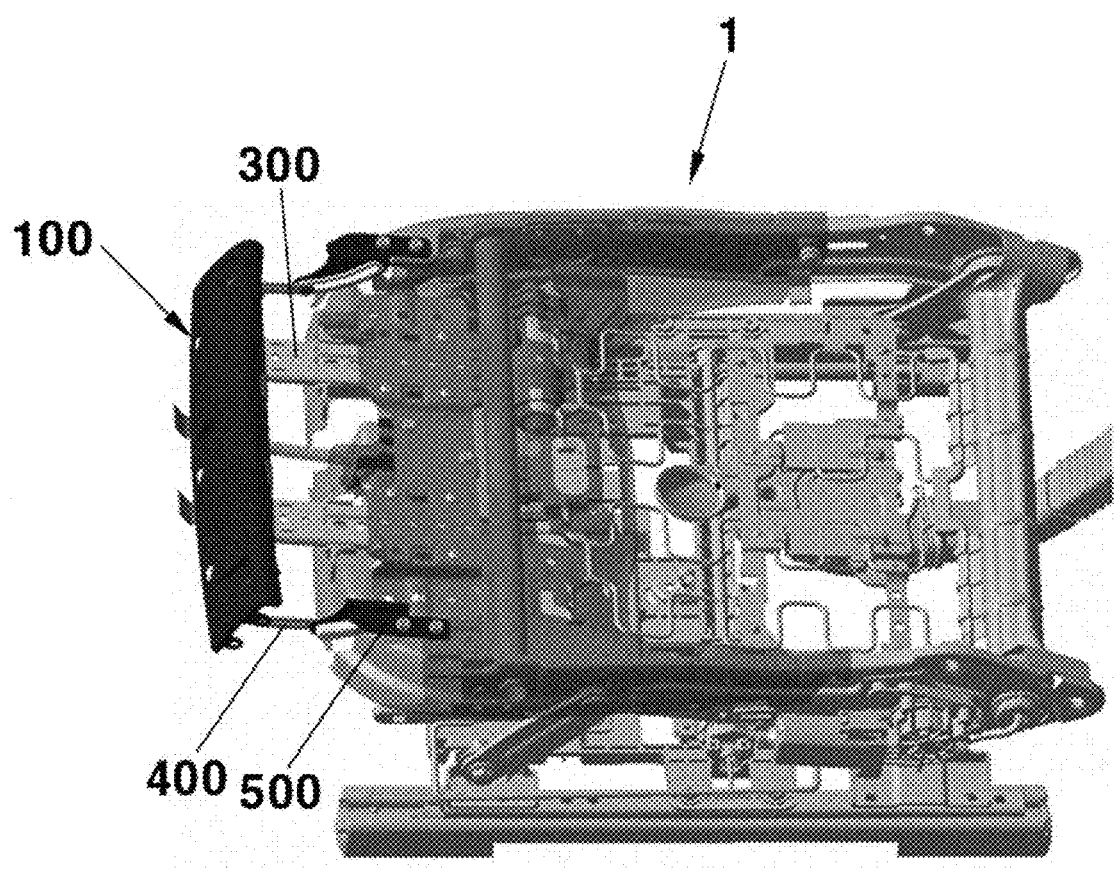
Figure 6A:
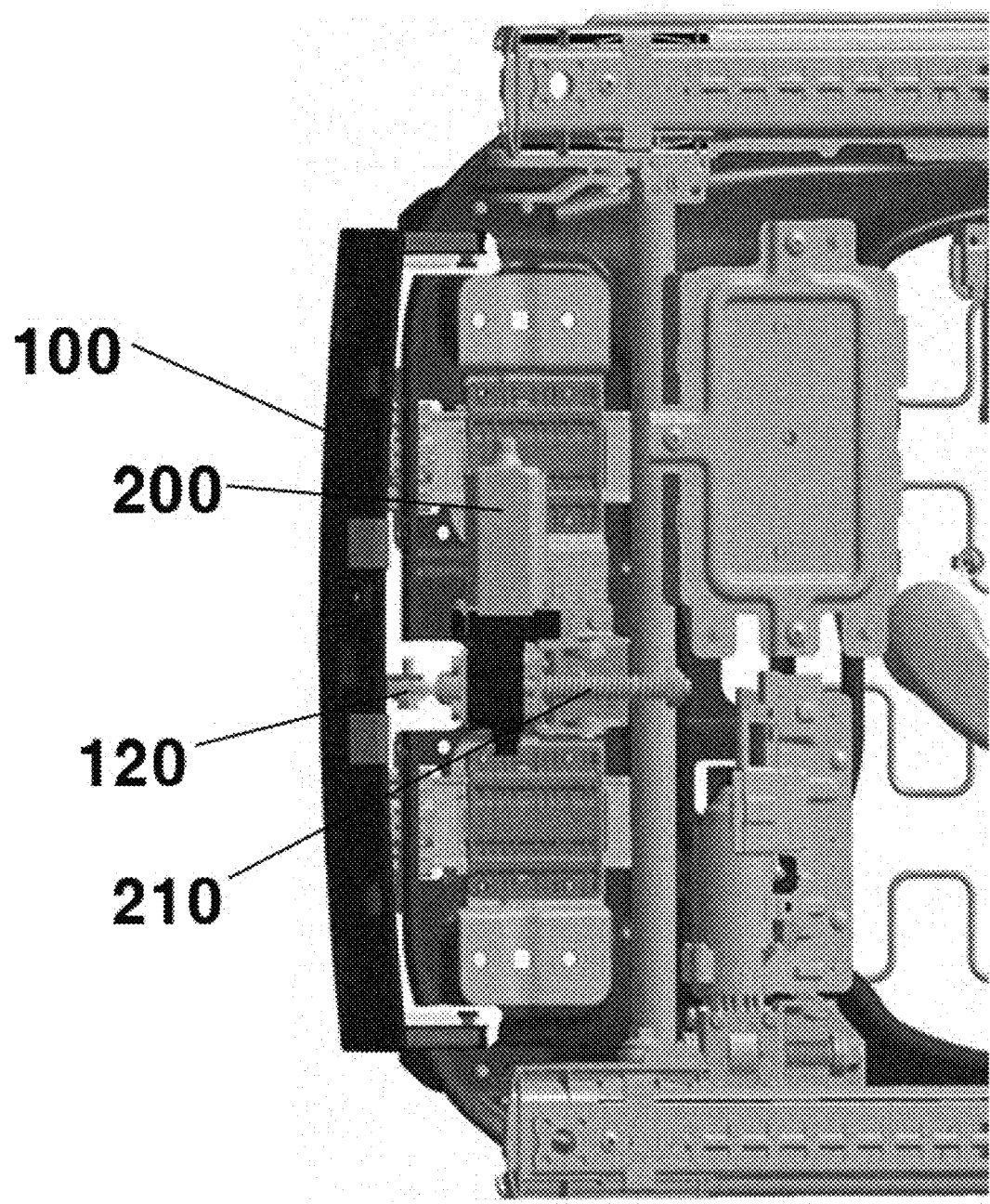
Figure 6B:
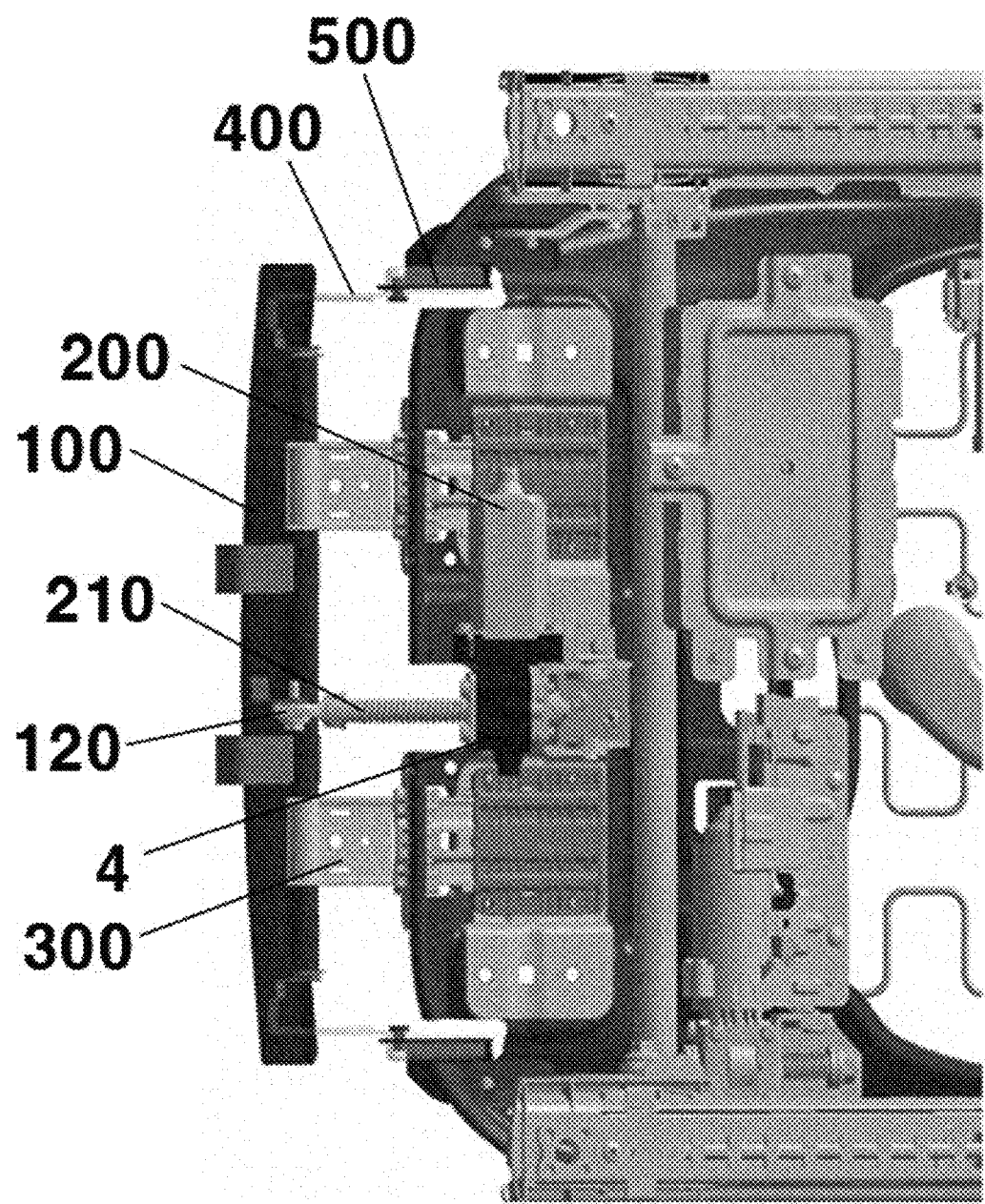
Figure 7A:
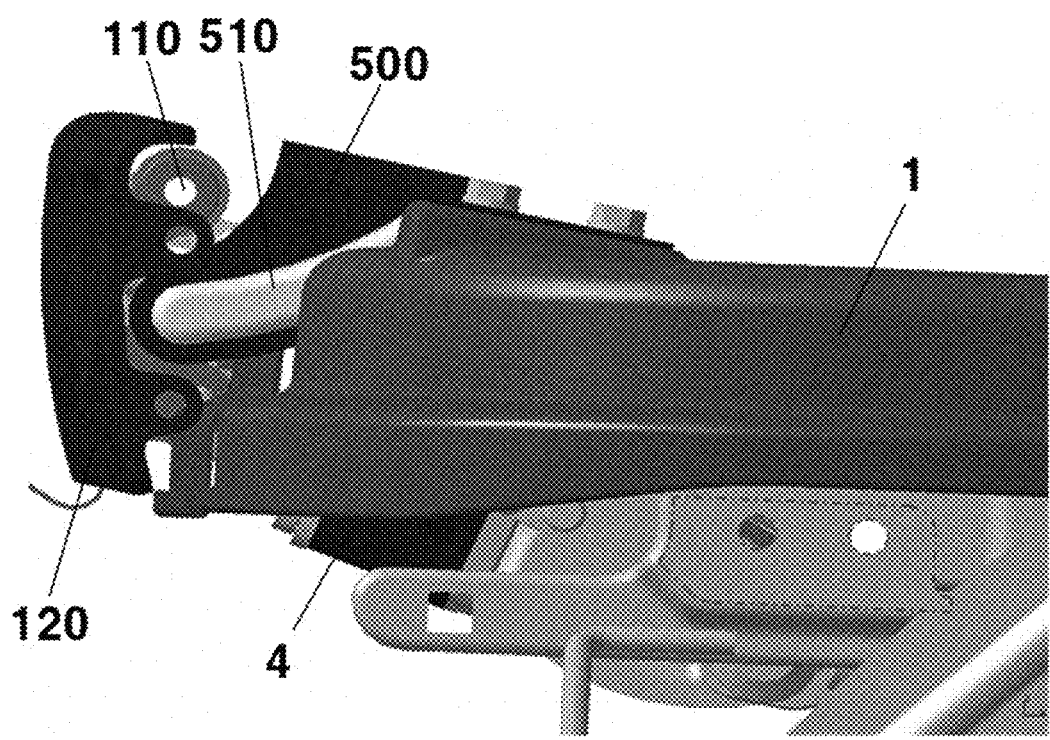
Figure 7B:
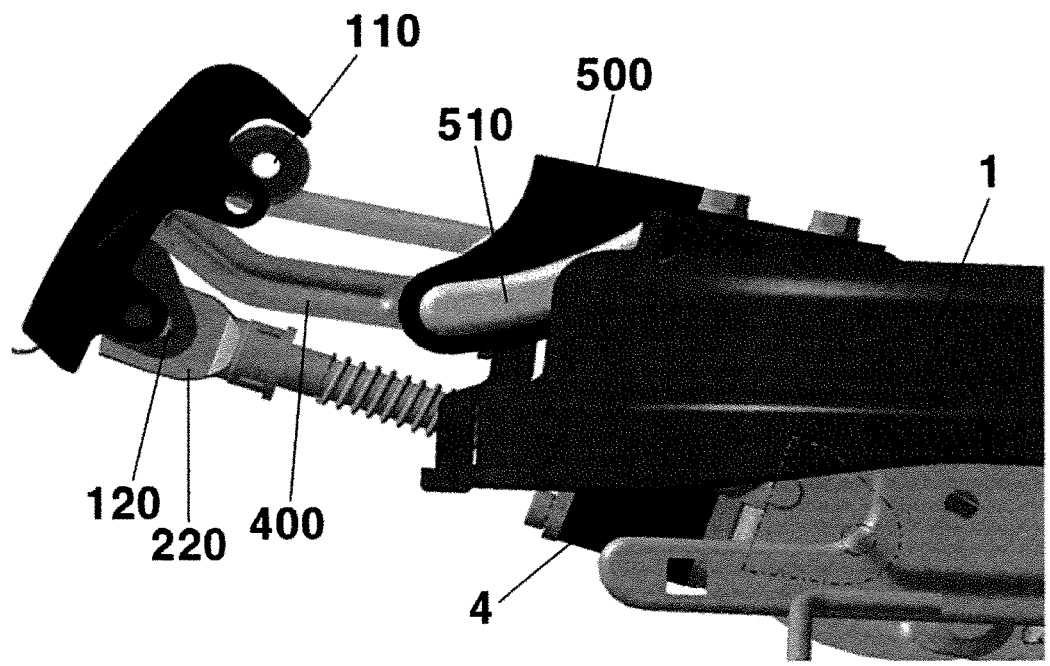

Detailed operations and actions in cases (a) before the actuation and (b) after the actuation will be described in detail with reference to FIGS. 5 to 7 accompanied with respect to the present inventive concept configured as above.

First, in the case (a) before the actuation, when the extension motor 200 is driven by power applied as the passenger who sits on the seat cushion operates an operation button, the seat goes forward from the control bush 4 through the rotation of the lead screw 210.

In this case, since the second hinge bracket 120 of the extension panel 100 and the connection tab 220 of the lead screw 210 are hinge-coupled to each other, the extension panel 100 also moves forward together with the progress of the lead screw 210.

Meanwhile, the extension panel 100 is rotatable upward by the hinge-coupling of the hinge pipe 310 of the slide rail 300 and the first hinge bracket 110 of the extension panel 100 while moving forward along the slide rail 300 connected to the rail groove 3 formed on the upper panel 2 of the cushion frame 1.

Herein, while the guide roll 410 of the side bracket 400 moves along the guide hole 510 of the guide bracket 500, the extension panel 100 is operated smoothly so as to maintain the rotation of the extension panel 100 at a constant speed and extension is completed according to a physique of the passenger.

Meanwhile, when the seat returns to an original position again (b) after the actuation, the actuation is performed in a reverse order to (a) described above.

Moreover, maintaining the rotation of the extension panel 100 at a constant speed through the present inventive concept prevents an upper covering from being torn during the extension and prevents the covering from being taken off by securing a margin of the covering rotated in engagement with sliding.

According to the present inventive concept described as above, because a femoral region is supported without interfering with a calf part of a passenger, and by preventing a loosing phenomenon of a seat cushion during extension, a stable posture can be maintained and, since no wrinkles are generated at a corner portion of a covering in spite of repeated bending work, an aesthetic exterior can be maintained.

Further, due to fewer components than in the related art, weight and material are structurally saved, and as a result, total cost can be reduced.

Terms and words used in the present specification and claims should not be interpreted as being limited to typical or dictionary meanings, but should be interpreted as having meanings and concepts which comply with the technical spirit of the present inventive concept, based on the principle that an inventor can appropriately define the concept of the term to describe his/her own inventive concept in the best manner.

Therefore, configurations illustrated in the drawings and the embodiments described in the present specification are only exemplary embodiment of the present inventive concept and do not represent all of the technical spirit of the present inventive concept, and thus it is to be understood that various equivalents and modified examples, which may replace the configurations, are possible when filing the present application.

The inventive concept has been described in detail with reference to multiple embodiments thereof. However, it will be appreciated by those skilled in the art that changes may be made in these embodiments without departing from the principles and spirit of the inventive concept, the scope of which is defined in the appended claims and their equivalents.

What is claimed is:

1. A seat cushion extension apparatus comprising:
a slide rail disposed on a lower side of a cushion frame;
an extension panel coupled to a front end of the slide rail and disposed on a front side of the cushion frame;
an extension motor having a lead screw, disposed on the lower side of the cushion frame;
a first hinge bracket coupled to the end of the slide rail and disposed at a rear upper side of the extension panel; and
a second hinge bracket coupled to the end of the lead screw and disposed at a rear lower side of the extension panel,
wherein the extension panel is configured to translate forwardly with the slide rail and to extend forward while rotating in a front upper direction through actuation of the lead screw driven by the extension motor.

2. The apparatus of claim 1, further comprising guide brackets disposed on both sides of the cushion frame, and side brackets disposed on both ends of the extension panel.

3. The apparatus of claim 2, wherein the side brackets include a guide hole having a curved shape in the longitudinal direction of the side bracket, and a guide roll coupled to the guide hole.

4. The apparatus of claim 3, further comprising an injection-molded guide member disposed in the guide hole of the guide bracket and an injection-molded friction member disposed on the guide roll of the side bracket to correspond to the guide member.

5. The apparatus of claim 1, further comprising:
two rail grooves disposed on an upper panel of the cushion frame, and
a hinge pipe coupled to the slide rail and disposed in a horizontal direction.

6. The apparatus of claim 5, wherein:
the lead screw is coupled to a control bush disposed on the upper panel of the cushion frame, and
the lead screw is coupled to the second hinge bracket through a connection tab.

* * * * *